United States Patent
Pandher et al.

(10) Patent No.: US 10,065,274 B2
(45) Date of Patent: Sep. 4, 2018

(54) JOINING TO ALUMINUM

(71) Applicant: ALPHA ASSEMBLY SOLUTIONS INC., Waterbury, CT (US)

(72) Inventors: Ranjit Pandher, Plainsboro, NJ (US); Bawa Singh, Voorhees, NJ (US); Rahul Raut, Edison, NJ (US); Sanyogita Arora, North Arlington, NJ (US); Ravindra Bhatkal, East Brunswick, NJ (US); Bin Mo, East Brunswick, NJ (US)

(*) Notice: Subject to any disclaimer, the term of this patent is extended or adjusted under 35 U.S.C. 154(b) by 0 days.

(21) Appl. No.: 14/909,888

(22) PCT Filed: Aug. 29, 2014

(86) PCT No.: PCT/GB2014/052623
§ 371 (c)(1),
(2) Date: Feb. 3, 2016

(87) PCT Pub. No.: WO2015/028813
PCT Pub. Date: Mar. 5, 2015

(65) Prior Publication Data
US 2016/0175994 A1 Jun. 23, 2016

Related U.S. Application Data

(60) Provisional application No. 61/871,416, filed on Aug. 29, 2013.

(51) Int. Cl.
*B23K 35/36* (2006.01)
*B23K 35/26* (2006.01)
(Continued)

(52) U.S. Cl.
CPC ......... *B23K 35/3612* (2013.01); *B23K 1/012* (2013.01); *B23K 1/085* (2013.01);
(Continued)

(58) Field of Classification Search
CPC .................. B23K 1/085; B23K 35/3613; B23K 35/3612; B23K 35/0244; B23K 35/025; B23K 35/262
(Continued)

(56) References Cited

U.S. PATENT DOCUMENTS

| 2,286,298 A | 6/1942 | Miller |
| 2,664,370 A | 12/1953 | Snell et al. |

(Continued)

FOREIGN PATENT DOCUMENTS

| CN | 101480764 | 7/2009 | |
| GB | 207015 A | * 11/1923 | ......... B23K 35/3612 |

(Continued)

OTHER PUBLICATIONS

International Search Report, PCT/GB2014/052623, dated Feb. 6, 2015, 4 pages.
Written Opinion, PCT/GB2014/052623, dated Feb. 6, 2015, 4 pages.

*Primary Examiner* — Weiping Zhu
(74) *Attorney, Agent, or Firm* — Carmody Torrance Sandak & Hennessey LLP

(57) ABSTRACT

A flux comprising one or more amines which is especially useful as a solder flux in soldering operations involving reactive metals such as aluminum; and a process for making aluminum surfaces solderable using the flux and conventional solders.

12 Claims, 2 Drawing Sheets

Process Schematic 1a

Process Schematic 1b

(51) Int. Cl.
  *B23K 35/362* (2006.01)
  *B23K 35/02* (2006.01)
  *B23K 1/012* (2006.01)
  *B23K 1/08* (2006.01)
  *B23K 1/19* (2006.01)
  *C22C 13/00* (2006.01)

(52) U.S. Cl.
  CPC .............. *B23K 1/19* (2013.01); *B23K 35/025* (2013.01); *B23K 35/262* (2013.01); *B23K 35/362* (2013.01); *B23K 35/3613* (2013.01); *C22C 13/00* (2013.01)

(58) Field of Classification Search
  USPC .......................................................... 148/23
  See application file for complete search history.

(56) References Cited

U.S. PATENT DOCUMENTS

| | | | |
|---|---|---|---|
| 3,040,781 A | 6/1962 | Reymann et al. | |
| 3,655,461 A | 11/1972 | Miwa | |
| 5,989,362 A | 11/1999 | Diamant et al. | |
| 2001/0022989 A1* | 9/2001 | Soutar | C23C 18/42 427/97.1 |
| 2002/0046627 A1* | 4/2002 | Amita | B23K 35/0244 75/252 |
| 2006/0180245 A1* | 8/2006 | Wicker | B23K 35/025 148/23 |

FOREIGN PATENT DOCUMENTS

| | | |
|---|---|---|
| GB | 1478644 A | 7/1977 |
| JP | S62199289 | 9/1987 |
| RU | 2280548 C1 * | 7/2006 |

* cited by examiner

Continued below.

JOINING TO ALUMINUM

REFERENCE TO RELATED APPLICATIONS

This application is a U.S. national stage application of PCT serial no. PCT/GB2014/052623, filed Aug. 29, 2014, and claims the benefit of U.S. provisional application No. 61/871,416, filed Aug. 29, 2013, the entire disclosures of which are incorporated herein by reference.

FIELD OF THE INVENTION

The invention relates to an improved solder flux, in particular a solder flux for use in soldering to aluminum. The invention also relates to a process for making aluminum surfaces solderable using the flux and conventional solders.

Soldering processes are typically facilitated by the use of a flux. One of the obstacles to a successful solder joint is an impurity at the site of the joint, for example, dirt, oil or oxidation. The impurities can be removed by mechanical cleaning or by chemical means, but the elevated temperatures required to melt the filler metal (the solder) encourages the work piece (and the solder) to re-oxidize. This effect is accelerated as the soldering temperatures increase and can completely prevent the solder from joining to the work piece.

There is a strong desire on the part of industry participants in a wide range of industries and end-use applications to lower the weight and cost of assemblies, such as electronic circuits and wire harnesses including those used in automotive, LED assemblies and PV modules. Specifically there is a desire to eliminate the currently used copper layer in printed circuit boards and replace it with aluminum. Further, it would be advantageous to replace typical solder coated copper ribbon with solder coated aluminum in order to achieve weight and cost savings.

However, soldering directly to aluminum poses significant technical challenges. Specifically it is extremely difficult to break down the oxide layer on the surface in order to create a direct connection to the aluminum metal. Aluminum is very prone to oxidation creating a very tenacious oxide layer, which tends to reform immediately after exposure to air.

Soldering to aluminum can be accomplished by depositing/plating onto the aluminum or by creating an intermediate layer that results in a solderable surface. Other approaches include use of very aggressive fluxes to remove the oxide layer combined with highly reactive solders such as SnZnAl. Joining directly to aluminum can also involve use of brazing alloys which is implemented at high temperatures. This process is not compatible with electronic assemblies. Recent attempts to develop a solder pastes to solder directly to aluminum involve reflow process at very high temperatures (>280° C.), which again cannot be tolerated by electronic components and substrates. Accordingly, there is a need for a solder flux which enables simple soldering to aluminum without the need for an intermediate layer or an aggressive solder, and which can be used in a soldering process that is compatible with electronic assemblies.

SUMMARY OF THE INVENTION

The present invention seeks to tackle at least some of the problems associated with the prior art or at least to provide a commercially acceptable alternative solution thereto.

The present invention provides a flux comprising one or more amines.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

DETAILED DESCRIPTION OF PREFERRED EMBODIMENTS

Figure 1:
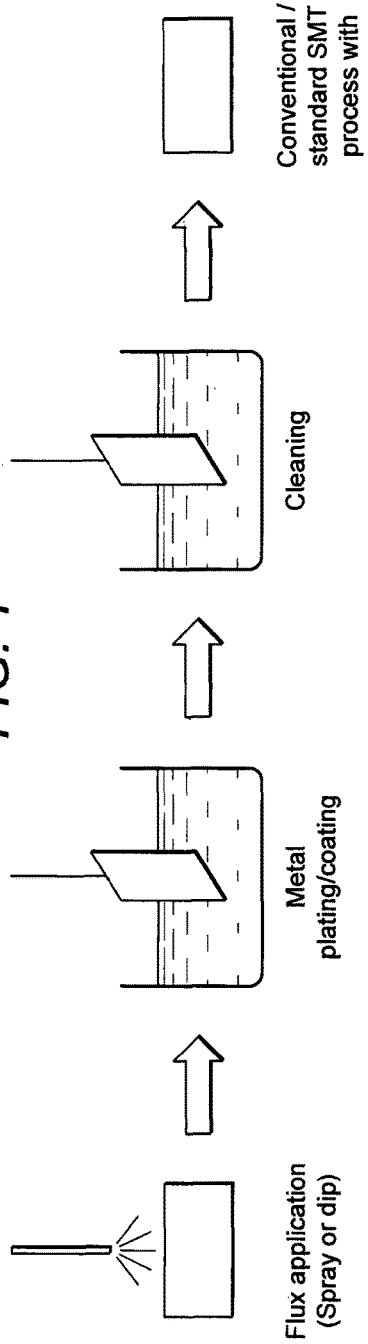
FIG. 1 shows a schematic of a method of processing an aluminum surface according to the present invention.
Figure 1:
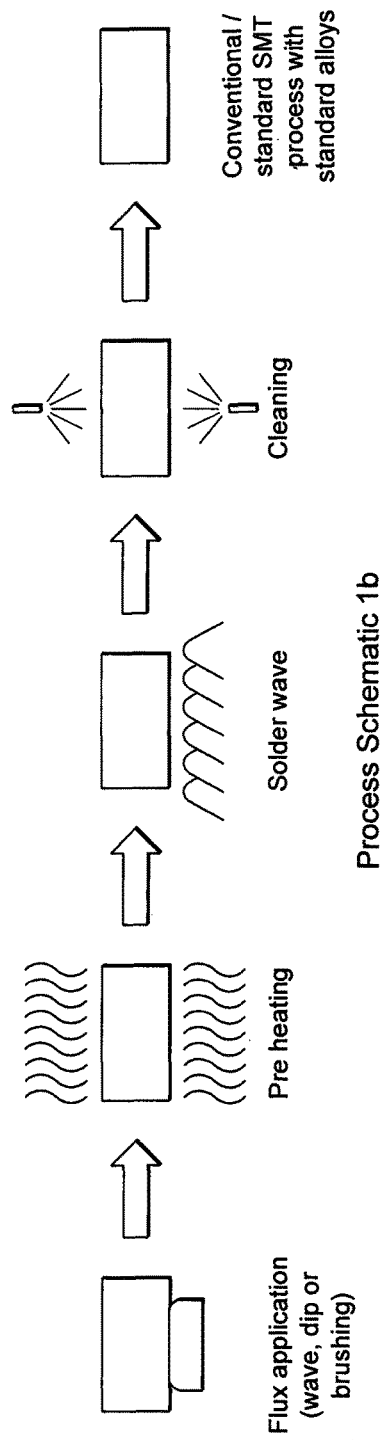

The term "flux" used herein encompasses a species for removing impurities, for example, dirt, oil or oxides, from a work piece prior to soldering.

The term "aluminum work piece" used herein encompasses a work piece having aluminum and/or aluminum alloy at a surface thereof.

The inventors have surprisingly found that the flux of the present invention is capable of enabling soldering to an aluminum work piece.

In use, the flux is contacted with the surface of an aluminum work piece to be soldered. The flux may be contacted with the surface prior to soldering, typically by immersing the work piece in the flux. Alternatively, the flux may be contacted with the surface together with solder. For example, the surface may be contacted with a paste comprising the flux and solder particles. In this case, the flux will remove aluminum oxide from the surface of the work piece before a subsequent heating step causes the solder particles to form a solder joint.

Without being bound by theory, it is considered that the presence of one or more amines may serve to dissolve aluminum oxide from the aluminum work piece. Accordingly, a subsequent soldering step may result in the formation of a strong solder joint.

As well as removing aluminum oxide from the surface of an aluminum work piece, the flux may also inhibit subsequent re-oxidation of the surface. This may be particularly advantageous when the soldering step is carried out some time after the flux is contacted with the surface of the aluminum work piece. In addition, this may enable the use of solder pastes containing species that may otherwise cause re-oxidation or corrosion of the aluminum. The one or more amines may also advantageously function as a surfactant in the flux.

The one or more amines may advantageously exhibit high thermal stability. Accordingly, the flux may be used at high temperatures with a wide range of solders.

The flux is advantageously water soluble, meaning that any residue formed on the aluminum surface after it has been contacted with the flux may be removed by washing. Such a step eliminates any potential concerns regarding corrosion and reliability.

The amines preferably comprise an ethanolamine and/or an ethoxylated amine. Such amines (e.g. ethoxylated tallow amines and ethoxylated polyamine) may be particularly effective at activating the surface of the aluminum substrate, i.e. they may be particularly effective at dissolving aluminum oxide, and may also exhibit particularly high thermal stability. Such amines may also function as particularly effective surfactants.

The one or more amines is preferably selected from: monoethanol amine, diethanol amine, triethanol amine, aminoethylethanol amine, ethoxylated tallow amines, and ethoxylated polyamine. Such amines are particularly effective at dissolving aluminum oxide from the surface of an aluminum work piece.

In a particularly preferred embodiment, the flux comprises:
from 10 to 45% by weight monoethanol amine, and/or
from 15 to 30% by weight triethanol amine, and/or
from 10 to 35% by weight aminoethylethanol amine, and/or
from 5 to 36% by weight etholoxated tallow amines, and/or
from 1 to 10% by weight etholoxated polyamine.

Such a combination of amines in the recited ranges may result in a flux which exhibits particularly high thermal stability and aluminum oxide dissolution. The flux may also be particularly effective at inhibiting subsequent re-oxidation and/or corrosion of the treated surface.

In a particularly preferred embodiment, the flux comprises:
from 10 to 40 wt. % monoethanol amine;
from 15 to 30 wt. % triethanol amine;
from 10 to 35 wt. % aminoethylethanol amine;
from 5 to 20 wt. % etholoxated tallow amine; and
optionally from 1 to 10 wt. % etholoxated polyamine.

Such a combination of amines in the recited ranges may result in a flux which exhibits particularly high thermal stability and aluminum oxide dissolution. The flux may also be particularly effective at inhibiting subsequent re-oxidation and/or corrosion of the treated surface.

The flux preferably further comprises an activator. The activator may serve to help dissolution of aluminum oxide from the surface of an aluminum work piece.

The activator is preferably selected from one or more of zinc chloride, aluminum chloride and fluoroboric acid. Such species are particularly effective at removing aluminum oxide.

In a preferred embodiment, the flux comprises:
from 1 to 5% by weight aluminum chloride and/or
from 5 to 15% by weight zinc chloride, and/or
from 5 to 15% by weight fluoroboric acid.

The flux may advantageously further comprise a surfactant, preferably selected from octyl phenol ethoxylates and nonyl phenol ethoxylates.

In a preferred embodiment, the flux comprises:
from 10 to 40 wt. % monoethanol amine;
from 15 to 30 wt. % triethanol amine;
from 10 to 35 wt. % aminoethylethanol amine;
from 5 to 20 wt. % etholoxated tallow amine;
from 1 to 5 wt. % water;
from 1 to 5 wt. % ammonium chloride;
from 5 to 15 wt. % zinc chloride;
from 5 to 15 wt. % fluoroboric acid, 50%;
from 1 to 5 wt. % tin fluoroborate; and
from 1 to 5 wt. % nonyl and/or octyl phenol ethoxylate (total amount of).

In a preferred embodiment, the flux comprises
from 10 to 40 wt. % monoethanol amine;
from 15 to 30 wt. % triethanol amine;
from 10 to 35 wt. % aminoethylethanol amine;
from 5 to 20 wt. % etholoxated tallow amine;
from 1 to 5 wt. % water;
from 1 to 5 wt. % ammonium chloride;
from 5 to 15 wt. % zinc chloride;
from 5 to 15 wt. % fluoroboric acid, 50%;
from 1 to 5 wt. % tin fluoroborate; and
from 1 to 10 wt. % etholoxated polyamine.

The fluxes of these preferred embodiments exhibit particularly favourable aluminum dissolution and high temperature stability, and are particularly suitable for rendering an aluminum work piece in a condition for subsequent soldering using a tin-based solder.

The flux may be for use in the manufacture of a printed circuit board, an LED or a photovoltaic module.

In a further aspect, the present invention provides a solder paste comprising the flux described herein. The solder paste typically also comprises solder particles.

Any conventional tin-based solder may be used, for example lead-based solders (e.g. Sn63Pb37, Sn62, Pb36Ag2) or lead-free solders (e.g. SnBi, SnBiAg, SAC305, Low Ag SAC, Innolot, SnAg and Sn100). The solder particles preferably comprise one or more of tin, tin-silver alloy, tin-silver-copper alloy, tin-bismuth alloy and tin-silver-bismuth alloy. Particularly suitable solder particles may comprise one or more of: SnBi, SnBiAg, SAC305, Low Ag SAC, Innolot (see, for example, WO2004096484, the contents of which is hereby incorporated by reference), SnAg and Sn100. Such solder particles may form a particularly strong solder joint with an aluminum work piece. In addition, such solders are advantageously lead-free, which avoids problems with toxicity.

The amounts of solder particles and flux contained in the solder paste are not limited. The amount of solder particles contained in the solder paste may be, for example, from 10 to 99% by weight, or from 25 to 90% by weight, or from 50 to 85% by weight, or from 65 to 80% by weight. The solder paste may alternatively contain lower or higher amounts of solder particles. The flux may make up, for example, the substantial remainder of the solder paste. The solder paste may contain, for example, from 1 to 90% by weight flux, or from 10 to 75% by weight flux, or from 15 to 50% by weight flux, or from 20 to 35% by weight flux. The solder paste may alternatively contain lower or higher amounts of solder flux. The solder paste may contain species other that solder particles and flux.

The solder paste is typically stable in air at ambient conditions for at least three hours, preferably at least five hours. This may enable easy handling and storage of the paste.

In a further aspect, the present invention provides a soldered joint manufactured using the flux or the paste described herein. Such a soldered joint may exhibit high strength and/or thermal stability.

In a further aspect, the present invention provides a method of processing an aluminum surface comprising:
providing an aluminum surface;
contacting the aluminum surface with a flux as described herein followed by contacting the aluminum surface with a molten liquid comprising tin or tin alloy.

The term "aluminum surface" encompasses a surface at which is provided aluminum and/or aluminum alloy. Once contacted with the flux, the aluminum surface may be substantially devoid of aluminum oxide. The subsequent step of contacting the aluminum surface with a molten liquid comprising tin or tin alloy may result in the formation of an aluminum-tin eutectic. Such an aluminum-tin eutectic may enable effective soldering onto the aluminum surface using, for example, a conventional surface mount technology (SMT) process using conventional alloys.

The method may be effectively carried out in air or nitrogen atmospheres. The method is preferably carried out in a nitrogen atmosphere in order to minimise re-oxidation of the aluminum surface once it has been contacted with the flux.

The aluminum surface is contacted with the flux for a sufficient time to substantially remove aluminum oxide therefrom. The aluminum surface may be contacted with the flux for at least two seconds, preferably from 3 to 30 seconds, more preferably from 5 to 15 seconds.

The aluminum surface is preferably heated prior to being contacted with the flux, preferably to a temperature of at least 80° C., more preferably to from 90 to 150° C., even more preferably to about 100° C. or about 130° C. This may serve to increase the amount of aluminum oxide removed by the flux.

The method preferably further comprises washing the aluminum surface after contacting the aluminum substrate with the molten liquid. This may ensure that the aluminum surface is substantially free of impurities, thereby increasing the strength of a subsequent soldered joint formed on the aluminum-tin eutectic.

The step of contacting the aluminum surface with a flux may comprise spraying and/or dipping and/or brushing.

The step of contacting the aluminum surface with a molten liquid comprising tin or tin alloy may comprise hot air solder levelling and/or wave soldering. Such techniques are known in the art.

The method typically further comprises applying solder to the aluminum surface. The solder may be applied using any conventional soldering method. Preferably, the solder is applied using surface mount technology (SMT) reflow soldering.

In a further aspect, the present invention provides an aluminum substrate having an aluminum surface processed according to the method described herein.

In a further aspect, the present invention provides an aluminum substrate having a surface portion comprising an aluminum-tin eutectic layer.

In a further aspect, the present invention provides a solder-coated aluminum ribbon, preferably a photovoltaic solder-coated aluminum ribbon, wherein the aluminum ribbon comprises the substrate described herein.

In a further aspect, the present invention provides a printed circuit board or LED comprising the aluminum substrate described herein.

In a further aspect, the present invention provides use of the flux as described herein or the solder paste described herein in the manufacture of a device selected from: a printed circuit board, an LED and a photovoltaic module.

In a further aspect, the present invention provides a method for making aluminum surfaces solderable, preferably solderable with a tin-based solder, the method using the flux as described herein or the paste as described herein.

Aspects of the present invention are further described as follows:

Concept:

Current invention involves soldering—Sn or Sn based alloys to Al surfaces. This can be achieved through the use of specially designed fluxes and/or pastes.

Process:

Process 1:

Process involves application of a specially developed/formulated flux to Al surface. The Al surface may comprise or consist of aluminum and/or aluminum alloy.

Fluxed Al surface is exposed to liquid metal, e.g., a traditional HASL (refer Schematic 1a) or wave solder equipment (refer Schematic 1b) for a very short time.

During this short exposure of fluxed surface to liquid metal, surface oxides are removed and Al and Sn form an AlSn eutectic at the interface.

After this tinning step, any residue is thoroughly cleaned. This eliminates the risk for corrosion and related reliability concerns.

The end result of this process is an Al surface with a metal plating that can be soldered using standard electronic materials and processes.

Process 2:

Alternate process uses a specially designed solder paste which uses common lead-free solder alloys with the specially formulated flux.

Flux is water soluble and any residue on the joint can be cleaned easily. This step eliminates any potential concerns of corrosion and reliability as an inherent nature of the highly active fluxes used.

Process is same as standard SMT (surface mount technology) reflow soldering.

Material Sets:

Fluxes:

Fluxes used to remove Al oxides to promote adhesion of Solders to Al surfaces. These fluxes are corrosive in nature and use a combination of amines to provide activity.

E.g., for liquid flux formulation 1, weight percentage—Monoethanol amine ranging from (10%-40%), Triethanol Amine ranging from (15%-30%), Aminoethylethanol Amine (10%-35%), Ethoxylated Tallow Amines (5%-20%), Water (1%-5%), Ammonium Chloride (1%-5%), Zinc Chloride (5%-15%), Fluoroboric Acid, 50% (5%-15%), Tin Fluoroborate (1%-5%), Nonyl/Octyl Phenol Ethoxylates (1%-5%).

E.g., for liquid flux formulation 2—weight percentage—Monoethanol amine ranging from (10%-40%), Triethanol Amine ranging from (15%-30%), Aminoethylethanol Amine (10%-35%), Ethoxylated Tallow Amines (5%-20%), Water (1%-5%), Ammonium Chloride (1%-5%), Zinc Chloride (5%-15%), Fluoroboric Acid, 50% (5%-15%), Tin Fluoroborate (1% 5%) and Etholoxated Polyamine (1%-10%).

E.g., for liquid flux formulation 3—weight percentage—Monoethanol amine (30%-45%), Triethanol Amine (18%-22%), Ethoxylated Tallow Amine (10%-17%), Water (2%-5%), Ammonium Chloride (1%-3%), Zinc Chloride (10%-13%), Fluoroboric Acid, 50% (10%-15%), Tin Fluoroborate (2%-4%).

E.g., for paste flux formulation 4—weight percentage—Monoethanol amine (10%-40%), Triethanol Amine ranging from (15%-30%), Aminoethylethanol Amine (10%-35%) Ethoxylated Tallow Amine (10%-36%), Water (1%-5%), Ammonium Chloride (1%-5%), Zinc Chloride (5%-15%), Fluoroboric Acid, 50% (5%-15%), Tin Fluoroborate (1% 5%) and Etholoxated Polyamine (1%-10%).

E.g., for paste flux formulation 5—weight percentage—Monoethanol amine ranging from (12%-20%), Triethanol Amine (15%-20%), Ethoxylated Tallow Amine (30%-35%), Water (1%-5%), Ammonium Chloride (1%-4%), Zinc Chloride (10%-13%), Fluoroboric Acid, 50% (10% 15%), Tin Fluoroborate (2%-4%).

Amines that may be used for corrosion inhibitors include, for example: etholoxated amines such as, for example, etholoxated tallow amine and etholoxated polyamine. Ethoxylated amines have multiple functions such as: activators, surfactants, corrosion inhibition and to provide thermal stability to withstand soldering temperatures/time and assist in removal of flux residues with water after soldering operations.

Activators that may be used include, for example: ammonium chloride, zinc chloride, tin fluoroborate, fluoroboric acid, aminoethyl ethanol amine, alkanolamines e.g. monoethanol amine, triethanol amine, diethanolamine, etholoxated amines e.g. etholoxated tallow amine and etholoxated polyamines.

Surfactants that may be used include, for example: etholoxated molecules such as, for example, etholoxated tallow amine, etholoxated polyamine, octyl phenol ethoxylates and nonyl phenol ethoxylates.

Solder

The flux described herein may be used in combination with solder particles.

Any common Sn based solder can be used for soldering to Al.

Soldering can be lead-based (for e.g., Sn63Pb37, Sn62, Pb36Ag2) or lead-free (SnBi, SnBiAg, SAC305, Low Ag SAC alloys, Innolot, SnAg, Sn100, etc.)

There is no need for highly reactive solders such as Zn based, which are currently been recommended.

Applications:

Standard Electronic PCBs,

Electronic PCBs for Automotive applications,

LEDs (e.g., Die attach, package attach and optically reflective surfaces),

PV modules (assembly using Sn coated Al ribbons),

Others (e.g., highly thermal conductive preforms)

Advantages:

The amines may serve to remove the aluminum oxide layer present on the surface of aluminum substrates. The amines are also stable at high temperatures.

The invention will now be described in relation to the following non-limiting drawings, in which:

Referring to FIG. 1, process schematic 1a is a schematic of a method of the present invention. The steps include, from left to right, (a) flux application to an aluminum work piece by spraying or dipping, (b) immersion of the aluminum work piece into a bath containing metal or metal alloy to plate or coat the aluminum substrate, (c) cleaning the aluminum work piece, and (d) soldering using a conventional/standard SMT process with standard alloys. Process schematic 1b includes, from left to right, (a) flux application to an aluminum work piece by wave flow, dipping, or brushing, (b) pre-heating the aluminum work piece, (c) wave soldering, (d) cleaning and (e) soldering using a conventional/standard SMT process with standard alloys.

Figure 2:
FIG. 2 shows a schematic of a method of processing an aluminum surface according to the present invention.

Referring to FIG. 2, process schematic 2 is a schematic of a method of the present invention. The steps include, from left to right, (a) formation of a specially developed solder paste using standard alloys, (b) printing/dispensing of the solder paste onto an aluminum work piece, (c) picking and placing components onto the paste, (d) carrying out solder reflow, and (e) cleaning of the assembly.

The invention will now be described in relation to the following non-limiting examples.

Example 1

A flux according to the present invention was prepared comprising, in weight percentage—Monoethanol amine ranging from (10%-40%), Triethanol Amine ranging from (15%-30%), Aminoethylethanol Amine (10%-35%), Ethoxylated Tallow Amines (5%-20%), Water (1%-5%), Ammonium Chloride (1%-5%), Zinc Chloride (5%-15%), Fluoboric Acid, 50% (5%-15%), Tin Floroborate (1%-5%), Nonyl/OctylPhenolEthyloxates (1%-5%).

Aluminum boards were immersed in the flux under varying conditions prior to soldering. The conditions are shown in Table 1:

TABLE 1

| Immersion conditions. | | | |
|---|---|---|---|
| Contact time | Atmosphere | Pre-heating of board | Solder pot temperature |
| 3 seconds | air | none | 285° C. |
| 10 second | air | 130° C. | 285° C. |
| 10 second | N$_2$ | 130° C. | 285° C. |
| 8 second | N$_2$ | 130° C. | 285° C. |

While all conditions gave reasonable results, the most uniform, icicle-free soldered aluminum boards were prepared under nitrogen with a pre-heating step and a contact time of 8 seconds or more.

Example 2

The soldered joints formed in Example 1 were investigated using an electron microscope. A nice uniform interface was observed, indicating a good bond between the solder and the aluminum substrate. EDS analysis shows that the aluminum/solder interface contains mostly Al and Sn atoms. CuSn IMC is observed in the bulk.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of processing an aluminum surface comprising:
   contacting the aluminum surface with a flux, wherein the flux comprises:
   from 10 to 45% by weight monoethanol amine;
   from 15 to 30% by weight triethanol amine;
   from 10 to 35% by weight aminoethylethanol amine;
   from 5 to 36% by weight ethoxylated tallow amines; and
   from 1 to 10% by weight ethoxylated polyamine, and thereafter;
   contacting the aluminum surface with a molten liquid comprising tin or tin alloy.

2. The method of claim 1, further comprising the step of washing the aluminum surface after contacting the aluminum substrate with the molten liquid.

3. The method of claim 1, wherein the step of contacting the aluminum surface with a flux comprises spraying and/or dipping and/or brushing.

4. The method of claim 1, wherein the step of contacting the aluminum surface with a molten liquid comprising tin or tin alloy comprises hot air solder levelling and/or wave soldering.

5. The method of claim 1, wherein the flux comprises:
   from 10 to 40 wt. % monoethanol amine;
   from 15 to 30 wt. % triethanol amine;
   from 10 to 35 wt. % aminoethylethanol amine;
   from 5 to 20 wt. % etholoxated tallow amine; and
   from 1 to 10 wt. % etholoxated polyamine.

6. The method according to claim 1, wherein the flux further comprises a surfactant selected from octyl phenol ethoxylates and nonyl phenol ethoxylates.

7. The method according to claim 6 wherein the flux further comprises an activator selected from the group consisting of aluminum chloride, zinc chloride, tin fluoroborate, fluoroboric acid, aminoethyl ethanol amine, etholoxated amines, etholoxated polyamines and mixtures thereof.

8. The method according to claim 7, wherein the flux comprises:
from 1 to 5% by weight aluminum chloride and/or
from 5 to 15% by weight zinc chloride, and/or
from 5 to 15% by weight fluoroboric acid.

9. The method according to claim 7 wherein the flux further comprises water.

10. The method according to claim 9, wherein the flux comprises:
from 10 to 40 wt. % monoethanol amine;
from 15 to 30 wt. % triethanol amine;
from 10 to 35 wt. % aminoethylethanol amine;
from 5 to 20 wt. % etholoxated tallow amine;
from 1 to 5 wt. % water;
from 1 to 5 wt. % ammonium chloride;
from 5 to 15 wt. % zinc chloride;
from 5 to 15 wt. % fluoroboric acid,
from 1 to 5 wt. % tin fluoroborate; and
from 1 to 5 wt. % nonyl and/or octyl phenol ethoxylate.

11. The method according to claim 1 further comprising the step of preheating the aluminum surface to between 90° C. and 150° C. prior to contacting the aluminum surface with the flux.

12. The method according to claim 1, wherein the step of contacting the aluminum surface with the molten liquid is conducted in a nitrogen atmosphere.

* * * * *